United States Patent
Ishida et al.

(10) Patent No.: US 9,669,400 B2
(45) Date of Patent: Jun. 6, 2017

(54) METHOD FOR PURIFYING SILANE COMPOUND OR CHLOROSILANE COMPOUND, METHOD FOR PRODUCING POLYCRYSTALLINE SILICON, AND METHOD FOR REGENERATING WEAKLY BASIC ION-EXCHANGE RESIN

(71) Applicant: Shin-Etsu Chemical Co., Ltd., Tokyo (JP)

(72) Inventors: Masahiko Ishida, Niigata (JP); Hiroshi Saito, Niigata (JP); Atsushi Yoshida, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/777,954

(22) PCT Filed: Jan. 15, 2014

(86) PCT No.: PCT/JP2014/000153
§ 371 (c)(1),
(2) Date: Sep. 17, 2015

(87) PCT Pub. No.: WO2014/167757
PCT Pub. Date: Oct. 16, 2014

(65) Prior Publication Data
US 2016/0279628 A1  Sep. 29, 2016

(30) Foreign Application Priority Data
Apr. 11, 2013 (JP) ................. 2013-083307

(51) Int. Cl.
| B01J 41/04 | (2017.01) |
|---|---|
| B01J 41/08 | (2017.01) |
| B01J 49/00 | (2017.01) |
| C01B 33/107 | (2006.01) |
| C01B 33/04 | (2006.01) |
| B01J 41/07 | (2017.01) |
| B01J 41/09 | (2017.01) |
| B01J 49/57 | (2017.01) |

(52) U.S. Cl.
CPC ............ *B01J 41/046* (2013.01); *B01J 41/07* (2017.01); *B01J 41/09* (2017.01); *B01J 49/57* (2017.01); *C01B 33/046* (2013.01); *C01B 33/1071* (2013.01); *C01B 33/10778* (2013.01); *C01B 33/10784* (2013.01)

(58) Field of Classification Search
CPC ........ C01B 33/10778; C01B 33/10784; C01B 33/1071; C01B 33/046; B01J 41/09; B01J 41/07; B01J 49/57
USPC ................................................ 423/341, 342
See application file for complete search history.

(56) References Cited

U.S. PATENT DOCUMENTS

| 2,877,097 A | 3/1959 | Wolff |
|---|---|---|
| 3,414,603 A | 12/1968 | Mlavsky |
| 3,928,542 A | 12/1975 | Bakay |
| 4,526,769 A | 7/1985 | Ingle et al. |
| 4,986,971 A | 1/1991 | Forwald et al. |
| 2005/0145572 A1* | 7/2005 | Jangbarwala ........ B01D 15/362 210/670 |
| 2010/0224564 A1* | 9/2010 | Shafer ..................... B01J 47/14 210/662 |
| 2011/0236289 A1 | 9/2011 | Iiyama et al. |
| 2012/0148471 A1 | 6/2012 | Sugimura et al. |
| 2012/0183464 A1 | 7/2012 | Mueh et al. |
| 2013/0156675 A1* | 6/2013 | Breneman ............ C01B 33/043 423/342 |

FOREIGN PATENT DOCUMENTS

| CN | 102264642 A | 11/2011 |
|---|---|---|
| CN | 102482106 A | 5/2012 |
| EP | 2 371 765 A1 | 10/2011 |
| EP | 2 471 740 A1 | 7/2012 |
| JP | 59-173182 A | 10/1984 |
| JP | 60-36318 | 2/1985 |
| JP | 2-208217 A | 8/1990 |
| JP | 9-169514 A | 6/1997 |
| JP | 2012-153547 A | 8/2012 |
| RU | 2 394 762 C2 | 7/2010 |
| WO | WO 2010-074301 | 7/2010 |
| WO | WO 2011/006697 A1 | 1/2011 |
| WO | WO 2011/024276 | 3/2011 |

OTHER PUBLICATIONS

International Search Report issued Mar. 4, 2014, in PCT/JP2014/000153 filed Jan. 15, 2014.
Partial Search Report issued Dec. 7, 2016 in European Patent Application No. 14782400.7.
Combined Chinese Office Action and Search Report issued Aug. 3, 2016 in Patent Application No. 201480020915.7 (with English translation of Categories of Cited Documents).
Supplementary European Search Report dated Feb. 23, 2017 issued in corresponding European patent application No. 14 78 2400.

\* cited by examiner

*Primary Examiner* — Ngoc-Yen Nguyen
(74) *Attorney, Agent, or Firm* — Oblon, McClelland, Maier & Neustadt, L.L.P.

(57) ABSTRACT

The present invention provides a technique which allows stable use of an ion-exchange resin for removing boron impurities over a long period of time in the purification step of a silane compound or a chlorosilane compound. In the present invention, a weakly basic ion-exchange resin used for the purification of a silane compound and a chlorosilane compound is cleaned with a gas containing hydrogen chloride. When this cleaning treatment is used for the initial activation of the weakly basic ion-exchange resin, a higher impurity-adsorbing capacity can be obtained. Further, use of the cleaning treatment for the regeneration of the weakly basic ion-exchange resin allows stable use of the ion-exchange resin for a long time. This allows reduction in the amount of the resin used in a long-term operation and reduction in the cost of used resin disposal.

12 Claims, No Drawings

METHOD FOR PURIFYING SILANE COMPOUND OR CHLOROSILANE COMPOUND, METHOD FOR PRODUCING POLYCRYSTALLINE SILICON, AND METHOD FOR REGENERATING WEAKLY BASIC ION-EXCHANGE RESIN

TECHNICAL FIELD

The present invention relates to a technique for purifying a silane compound or a chlorosilane compound, more specifically to a technique for adsorbing and removing boron impurities with a weakly basic ion-exchange resin to obtain a high-purity silane compound or chlorosilane compound.

BACKGROUND ART

Silane compounds such as monosilane and disilane or chlorosilane compounds such as trichlorosilane, dichlorosilane, and tetrachlorosilane are used as a raw material for producing polycrystalline silicon required for the production of semiconductor devices or the production of solar cells (for example, Patent Literature 1: Japanese Patent Laid-Open No. 2012-153547).

Particularly, trichlorosilanes are important as a raw material for producing high-purity polycrystalline silicon, and examples of the known methods for producing trichlorosilanes include a direct method in which metallurgical-grade silicon and hydrogen chloride are reacted with each other (Patent Literature 2: Japanese Patent Laid-Open No. 2-208217, Patent Literature 3: Japanese Patent Laid-Open No. 9-169514) and a method in which tetrachlorosilane is reacted with hydrogen in the presence of metallurgical-grade silicon to reduce the tetrachlorosilane (Patent Literature 4: Japanese Patent Laid-Open No. 60-36318).

Incidentally, large amounts of boron compounds are contained in metallurgical-grade silicon. Therefore, if chlorosilanes are produced using metallurgical-grade silicon as a raw material, a boron impurity concentration in the resulting chlorosilanes will be about several ppm.

However, if polycrystalline silicon is produced using, as a raw material, chlorosilanes containing boron impurities at such a high concentration, the boron will be incorporated into polycrystalline silicon as an impurity and will act as an acceptor to significantly degrade the quality.

From such a background, various methods have been proposed as a method for removing boron impurities in a silane compound or a chlorosilane compound. Examples of the methods include an adsorption and removal method using a weakly basic ion-exchange resin (particularly, a weakly basic ion-exchange resin having a tertiary amine as an active group) (Patent Literature 5: International Publication No. WO 2011/24276, Patent Literature 6: U.S. Pat. No. 2,877,097, Patent Literature 7: U.S. Pat. No. 3,414,603).

CITATION LIST

Patent Literature

Patent Literature 1: Japanese Patent Laid-Open No. 2012-153547
Patent Literature 2: Japanese Patent Laid-Open No. 2-208217
Patent Literature 3: Japanese Patent Laid-Open No. 9-169514
Patent Literature 4: Japanese Patent Laid-Open No. 60-36318
Patent Literature 5: International Publication No. WO 2011/24276
Patent Literature 6: U.S. Pat. No. 2,877,097
Patent Literature 7: U.S. Pat. No. 3,414,603

SUMMARY OF INVENTION

Technical Problem

In a method for removing boron impurities using a weakly basic ion-exchange resin, the boron impurities can be easily removed only by passing a silane compound or a chlorosilane compound in a liquid or gaseous state through a column filled with the weakly basic ion-exchange resin.

When a weakly basic ion-exchange resin is continuously used for a long time, the effect of removing boron impurities will be reduced when the amount of the boron impurities adsorbed reaches the break through capacity of the ion-exchange resin. Therefore, it is necessary to regenerate the ion-exchange resin which has reached the break through capacity by a certain method to return the ion-exchange resin to a state where the ion-exchange resin can be used again for the adsorption and removal, or to replace the ion-exchange resin with a new ion-exchange resin.

Here, the break through capacity of boron impurities in an ion-exchange resin refers to the amount of the boron impurities which have been exchange-adsorbed in the ion-exchange resin at a point (breakthrough point) where the concentration of the boron impurities contained in a silane compound or a chlorosilane compound after the compound is passed through the ion-exchange resin has reached a previously determined concentration.

A method in which an acidic aqueous cleaning solution is used or a method in which both a basic aqueous cleaning solution and an acidic aqueous cleaning solution are used is employed for the regeneration of a weakly basic ion-exchange resin. However, since chlorosilanes easily react with water to produce silica, if the weakly basic ion-exchange resin is cleaned with an acidic or basic aqueous solution in the state where chlorosilanes remain in the ion-exchange resin or in a column, silica will adhere to the surface of the ion-exchange resin to significantly reduce the function. Therefore, in order to perform stable purification over a long period of time, it is necessary to replace a weakly basic ion-exchange resin with a new product at a high frequency.

However, when the operation of replacing a weakly basic ion-exchange resin with a new product is performed at a high frequency, a very small amount of chlorosilane remaining in a system may react with water in the air as purification equipment is opened, or a reaction between water held in a newly-filled ion-exchange resin and chlorosilane may produce hydrogen chloride, causing the corrosion of the equipment.

The present invention has been made in view of such problems, and an object of the present invention is to provide a technique which allows stable use of an ion-exchange resin for removing boron impurities over a long period of time in the purification step of a silane compound or a chlorosilane compound.

Solution to Problem

In order to solve the above problems, a method for purifying a silane compound or a chlorosilane compound according to the present invention includes using a weakly basic ion-exchange resin cleaned with a gas containing hydrogen chloride to adsorb and remove boron impurities contained in the silane compound or the chlorosilane compound with the weakly basic ion-exchange resin.

The water content in the gas containing hydrogen chloride is preferably 1 vol % or less.

Further, the gas containing hydrogen chloride is preferably a mixed gas including one or more gases selected from hydrogen, nitrogen, helium, and argon.

Furthermore, the weakly basic ion-exchange resin is preferably a weakly basic ion-exchange resin having a tertiary amine as an active group.

In a method for producing polycrystalline silicon according to the present invention, a silane compound or a chlorosilane compound purified by the above method for purifying a silane compound or a chlorosilane compound is used as a silicon raw material.

A method for regenerating a weakly basic ion-exchange resin according to the present invention employs cleaning treatment with a gas containing hydrogen chloride employed in the method for purifying a silane compound or a chlorosilane compound according to the present invention.

Advantageous Effects of Invention

In the present invention, a weakly basic ion-exchange resin used for the purification of a silane compound and a chlorosilane compound is cleaned with a gas containing hydrogen chloride. When this cleaning treatment is used for the initial activation of the weakly basic ion-exchange resin, a higher impurity-adsorbing capacity can be obtained. Further, use of the cleaning treatment for the regeneration of the weakly basic ion-exchange resin allows stable use of the ion-exchange resin for a long time. This allows reduction in the amount of the resin used in a long-term operation and reduction in the cost of used resin disposal.

DESCRIPTION OF EMBODIMENTS

In the present invention, when a silane compound or a chlorosilane compound is purified, boron impurities contained in these compounds are adsorbed and removed with a weakly basic ion-exchange resin cleaned with a gas containing hydrogen chloride.

The cleaning treatment is performed by passing the gas containing hydrogen chloride (cleaning gas) through the weakly basic ion-exchange resin. When such a cleaning gas is passed through the weakly basic ion-exchange resin, impurities bonded to the resin are replaced by hydrogen chloride, allowing the impurities to be expelled from the resin.

Boron impurities contained in a silane compound or a chlorosilane compound adsorb to a weakly basic ion-exchange resin used for the purification of these compounds, but when a gas containing hydrogen chloride (cleaning gas) is passed through such a weakly basic ion-exchange resin, the boron impurities bonded to the resin can be replaced by hydrogen chloride to expel the boron impurities from the resin. Therefore, the weakly basic ion-exchange resin is regenerated and can be used for the purification of a silane compound or a chlorosilane compound again.

Note that the cleaning treatment may be performed when the state of impurities adsorbed to the weakly basic ion-exchange resin (change of the amount of adsorbed impurities with time) is monitored and reduction in the adsorbing function is observed, or may be performed periodically in order to perform the cleaning treatment before the adsorbing function drops.

Although it is natural, the impurity content in the hydrogen chloride gas used for the cleaning gas is preferably low. The purity of the hydrogen chloride gas is preferably 98% or more, more preferably 99.5% or more.

The hydrogen chloride gas may be singly used as a cleaning gas, or may be used as a mixed gas with another gas so as to dilute hydrogen chloride in the cleaning gas. Examples of the dilution gas in this case include an inert gas, such as hydrogen gas, nitrogen gas, helium gas, and argon gas. Further, these inert gases may be used in combination. That is, one or more gases selected from hydrogen, nitrogen, helium, argon, and the like may be used as a dilution gas. In these inert gases, nitrogen gas is particularly preferred in terms of safety and economy.

Further, these inert gases may contain chlorosilanes, particularly tetrachlorosilane. Note that when chlorosilanes are contained here, it is preferred to use chlorosilanes which have been subjected to deboronation.

The weakly basic ion-exchange resin generates heat when the resin adsorbs hydrogen chloride gas. Particularly, unused resin generates significant heat, and a heat-resistant temperature of around 100° C. may be exceeded. Therefore, it is preferred to perform hydrogen chloride gas cleaning while passing a large amount of dilution gas as described above in the early stage of the hydrogen chloride gas treatment. The hydrogen chloride gas concentration at this time is preferably about 0.1 vol % to 5 vol %. When initial generation of heat is settled, it is preferred to increase the hydrogen chloride concentration to a level of 1 to 50 vol %. When the hydrogen chloride concentration in the mixed gas is lower than 0.1 vol %, or when the maximum hydrogen chloride concentration is lower than 1 vol %, the time until impurities are sufficiently replaced by hydrogen chloride may be longer, significantly reducing the efficiency of the purification process.

Further, the water content in the gas containing hydrogen chloride (cleaning gas) is preferably 1 vol % or less, more preferably 100 ppmv or less, further preferably 10 ppmv or less.

An ion-exchange resin contains water in the state of a commercially available product. When a silane compound or a chlorosilane compound is passed through such an ion-exchange resin, these compounds will react with the water contained in the resin to produce silica, which will adhere to the resin surface to reduce the impurity-removing function.

Further, if hydrogen chloride gas generated by the reaction between the above compound and water adsorbs to the resin, the resin temperature may increase to the heat-resistant temperature or more.

For these reasons, the weakly basic ion-exchange resin is preferably dehydrated in advance of use.

Dehydration (drying) method for the weakly basic ion-exchange resin may be performed by a well-known technique without any special limitation. Examples of such a method include a method in which a solvent having a low water content is used to replace adsorbed water with the solvent and a method in which dry gas is passed to dry the resin.

Particularly, the method in which dry gas is passed to dry the resin is preferred because dehydration treatment is easy, and waste liquid treatment and the like are unnecessary. The dry gas used in this method is not particularly limited as long as the gas does not react with a weakly basic ion-exchange resin, and examples thereof include hydrogen gas and an inert gas, such as nitrogen gas, helium gas, and argon gas.

Note that the water content in the dry gas used for dehydration is preferably 1 vol % or less, more preferably 100 ppmv or less, further preferably 10 ppmv or less, similar to the water content in the above gas containing hydrogen chloride (cleaning gas).

When a weakly basic ion-exchange resin is dehydrated by dry gas, preferred is, for example, a method in which a filling container is filled with the weakly basic ion-exchange resin, through which dry gas is passed under normal pressure or reduced pressure. If the ion-exchange resin is heated at this time, the water can be efficiently removed.

Note that since the heat-resistant temperature of the resin is as low as about 100° C. or less and an amine functional group tends to be eliminated at high temperatures, exceeding the heat-resistant temperature may cause reduction in the adsorbing function of boron impurities. Therefore, the ion-exchange resin needs to be heated at a temperature lower than the heat-resistant temperature.

The heat-resistant temperature of an ion-exchange resin depends on the type of the resin. Generally, water can be efficiently removed at a temperature lower than the heat-resistant temperature by a method in which dry gas is passed through an ion-exchange resin heated to 60 to 80° C. under a reduced pressure of 10 KPaA or less.

When boron impurities contained in a silane compound or a chlorosilane compound are adsorbed and removed by a weakly basic ion-exchange resin, a method is preferred, in terms of economy and operability, in which the silane compound or the chlorosilane compound in a liquid state or in a gaseous state is passed through a fixed bed in which a cylindrical container is filled with the weakly basic ion-exchange resin.

The shape of the filling container for the weakly basic ion-exchange resin is generally a cylindrical shape. The ratio of the filling height L to the diameter D of the container (L/D) is preferably as large as possible for performing stable treatment, but is preferably L/D=about 2 to 200, more preferably L/D=about 5 to 50, when practicality is taken into consideration.

Impurities are adsorbed by the ion-exchange resin in a short time, but when a weakly basic ion-exchange resin is received in a filling container having the above shape, it is generally preferred to design the superficial residence time to be about 15 to 120 minutes.

Since a weakly basic ion-exchange resin having a tertiary amine as an active group is extremely stable, the weakly basic ion-exchange resin having a tertiary amine as an active group is preferably used in the present invention.

In particular, a weakly basic ion-exchange resin having a styrene matrix and an amine active group represented by the general formula:—$NR_1R_2$ is excellent in chemical stability. Here, $R_1$ and $R_2$ in the formula each represent an alkyl group which may be the same or different, and the alkyl group desirably has 1 to 3 carbon atoms, particularly desirably 1 carbon atom.

Examples of the weakly basic ion-exchange resin which is easily available in the market and suitable for the present invention include AMBERLYST A21 (registered trademark) (ROHM & HAAS Co.), AMBERLYST B20-HG•DRY (registered trademark) (ORGANO CORP.), and DOWEX MWA-1 (registered trademark) (Dow Chemical Co.) and the like.

The products to be purified by the present invention are a silane compound and a chlorosilane compound, and these silane-based compounds are used as a raw material for producing high-purity polycrystalline silicon by the CVD method typified by the Siemens method. That is, the silane compound and chlorosilane compound which have been purified by the method according to the present invention are used as a silicon raw material for producing polycrystalline silicon.

Further, the weakly basic ion-exchange resin regenerated by the method according to the present invention is reused as a resin for purifying the above silane compound and chlorosilane compound.

Examples of the silane compound to be purified by the present invention include monosilane and disilane. Further, examples of the chlorosilane compound to be purified by the present invention include trichlorosilane, dichlorosilane, tetrachlorosilane, monochlorosilane, and chlorodisilanes represented by the general formula: $H_nSi_2Cl_{6-n}$ (n is an integer of 0 to 5).

Note that the above-described silane compound and chlorosilane compound may be of a single composition obtained by distillation and purification or may be a mixture of a plurality of silane compounds and/or chlorosilane compounds which are not distilled or taken during distillation and separation.

When the purification method according to the present invention is incorporated into the process for producing polycrystalline silicon, the purification method may be incorporated before the purification step of a primary product obtained by allowing metallurgical-grade silicon and hydrogen chloride to react with each other, or during multistage purification steps for removing trichlorosilane, or after a step of recovering tetrachlorosilane, or immediately before supplying trichlorosilane to the reaction for producing polycrystalline silicon.

Generally, boron impurities contained in a reaction product obtained by chlorination reaction of metallurgical-grade metal silicon or a reaction product obtained by reacting the metallurgical-grade metal silicon in the presence of tetrachlorosilane and hydrogen are often present in the form of various chlorides such as boron trichloride and diboron tetrachloride, but in addition, boron impurities which are replaced by hydrogen, such as boron dichloride and boron chloride, are also contained. All of these boron impurities can be removed by the purification method of the present invention.

When a silane compound or a chlorosilane compound containing boron impurities in a liquid state or in a gaseous state is passed through a purification apparatus (impurity-adsorbing apparatus) filled with the weakly basic ion-exchange resin described above, the boron concentration which is several to several tens ppmw before treatment will be reduced to several ppbw after treatment. However, as already described earlier, when the amount of impurities which have been adsorbed to the weakly basic ion-exchange resin by purification treatment reaches a break through capacity, so-called a breakthrough state will be formed, in which the impurity-removing function of the weakly basic ion-exchange resin will be reduced, and even if a silane compound or a chlorosilane compound in a liquid state or in a gaseous state is passed through the weakly basic ion-exchange resin, the impurity concentration after treatment will not be sufficiently reduced.

In such a case, the weakly basic ion-exchange resin is regenerated by the method according to the present invention, in which the residual liquid of a chlorosilane compound remaining in a resin-filling container is preferably discharged in order to guarantee the efficient contact between hydrogen chloride gas and the weakly basic ion-exchange resin, and in order not to generate a waste liquid containing a boron compound at high concentration.

Further, at this time, the chlorosilane compound in the weakly basic ion-exchange resin may be volatilized by passing 0.001 Nm$^3$/(hr·m$^3$-resin) or more, preferably 0.01 to 200 Nm$^3$/(hr·m$^3$-resin) of nitrogen gas through the weakly basic ion-exchange resin in a state where the resin is heated to a range that does not exceed the heat-resistant temperature, for example to 100° C. or less, preferably to 40 to 80° C. Further, nitrogen may be passed through the weakly basic ion-exchange resin while heating the resin under reduced pressure to volatilize the chlorosilane compound.

Subsequently, 0.0001 Nm$^3$/(hr·m$^3$-resin) or more, preferably 0.02 to 200 Nm$^3$/(hr·m$^3$-resin) of a cleaning gas containing hydrogen chloride gas is passed to expel a boron compound. The total amount of hydrogen chloride to be used may be 1 to 100 times by mole relative to the exchange capacity of the weakly basic ion-exchange resin. The temperature during the treatment may be room temperature, but boron impurities can be effectively expelled by heating. However, as described above, the heating temperature is set to the heat-resistant temperature of the resin or less, for example, 100° C. or less.

The weakly basic ion-exchange resin is regenerated by such hydrochlorination, and the regenerated weakly basic ion-exchange resin may be used as it is for removing boron impurities by passing a chlorosilane solution through the regenerated resin. However, if a silane having a Si—H bond such as trichlorosilane is passed immediately after passing hydrogen chloride gas, hydrogen may be produced by a reaction with adsorbed hydrogen chloride. Therefore, when the ion-exchange resin is used for removing boron impurities from a silane having a Si—H bond such as trichlorosilane, the adsorbed hydrogen chloride gas can be gently treated by passing a solution in which trichlorosilane is diluted with tetrachlorosilane in early stages of purification treatment.

Note that, in the gas cleaning of the ion-exchange resin, the boron impurities expelled from the weakly basic ion-exchange resin is discharged out of the purification system together with excessive hydrogen chloride gas and inert gas, and is subjected to hydrolysis treatment in exhaust-gas harm-removing equipment such as a wet scrubber using aqueous sodium hydroxide.

As already described earlier, the cleaning treatment with a cleaning gas containing hydrogen chloride gas is effective not only for the regeneration of a weakly basic ion-exchange resin by expelling boron impurities from the weakly basic ion-exchange resin which has adsorbed the boron impurities but also for the activation treatment (initial activation treatment) of unused weakly basic ion-exchange resin.

In the case of using a cleaning gas containing hydrogen chloride gas for such initial activation treatment, when hydrogen chloride gas is passed through unused weakly basic ion-exchange resin, adhering impurities will be removed to increase adsorption capacity. However, the temperature of the resin may increase to the heat-resistant temperature or more by the heat of adsorption of hydrogen chloride gas to the resin, which may reduce the function.

In such a case, it is preferred to use a cleaning gas diluted with an inert gas such as nitrogen, hydrogen, helium, and argon as described above to obtain cooling effect by the inert gas. For example, it is preferred to pass nitrogen for cooling in an amount from 1 time by mole to 1000 times by mole, preferably from 100 times by mole to 500 times by mole, relative to hydrogen chloride gas so as to treat the resin at the heat-resistant temperature of the resin or less.

Further, it is preferred to perform the initial activation operation after the container is filled with unused weakly basic ion-exchange resin and then drying operation of the ion-exchange resin is performed, similar to the operation for removing boron impurities as already described.

EXAMPLES

Hereinafter, the present invention will be specifically described with reference to Examples, but the present invention is not limited by these Examples.

Example 1

Effect of Expelling Boron Compound for Regeneration by Hydrogen Chloride Gas

A tube having an inside diameter of 9.7 mm and a filling height of 1000 mm was filled with AMBERLYST (registered trademark) B20-HG•DRY, heated to 50° C., and decompressed to 1 KPaA or less while passing nitrogen gas at 2 NL/min, thus drying the resin for 6 hours. The weight of the filled resin after drying was 19 g.

Subsequently, the resin was pretreated by passing tetrachlorosilane having a boron impurity concentration of 0.1 ppmw or less. Then, a cylinder was filled with 4.4 kg of a solution having a boron impurity concentration of 67 ppmw which was prepared by adding boron trichloride to tetrachlorosilane, and the solution was circulated through the resin by a pump in a closed system to adsorb the boron trichloride until the resin is saturated with the boron trichloride. As a result, the boron impurity concentration was 13 ppmw.

Next, the filled tube was pressurized with nitrogen gas to remove the solution in the tube, heated to 50° C., and decompressed to 5 KPaA or less while passing nitrogen gas through the tube at 2 NL/min, thus drying the resin for 48 hours.

Subsequently, the pressure was returned to normal pressure, and hydrogen chloride gas diluted to 30 vol % with nitrogen was passed through the column at 0.1 NL/min for 6 hours.

Then, the cylinder was again filled with 4.4 kg of a solution having a boron impurity concentration of 67 ppmw which was prepared by adding boron trichloride to tetrachlorosilane, and the solution was circulated through the resin by a pump in a closed system to adsorb the boron trichloride until the resin is saturated with the boron trichloride. As a result, the boron impurity concentration was reduced to 5 ppmw.

From the above results, the amount of the boron impurities adsorbed to the ion-exchange resin was 12.5 mg-boron/g-resin at the first time and 14.4 mg-boron/g-resin after the hydrogen chloride gas treatment. Thus, the effect of expelling adsorbed boron impurities for regeneration by hydrogen chloride gas was verified.

Comparative Example 1

Effect of Expelling Boron Compound for Regeneration by Passing Nitrogen Gas

AMBERLYST (registered trademark) B20-HG•DRY was dried and pretreated in the same manner as in Example 1. A cylinder was filled with 4.4 kg of a solution having a boron concentration of 67 ppmw which was prepared by adding boron trichloride to tetrachlorosilane, and the solution was circulated through the resin by a pump in a closed system to adsorb the boron trichloride until the resin is saturated with the boron trichloride. As a result, the boron impurity concentration was 15 ppmw.

Next, the filled tube was pressurized with nitrogen gas to remove the solution in the tube, heated to 50° C., and decompressed to 5 KPaA or less while passing nitrogen gas through the column at 2 NL/min, thus drying the column for 48 hours.

Then, the cylinder was again filled with 4.4 kg of a solution having a boron concentration of 67 ppmw which was prepared by adding boron trichloride to tetrachlorosilane, and the solution was circulated through the resin by a pump in a closed system to adsorb the boron trichloride until the resin is saturated with the boron trichloride. As a result, the boron impurity concentration was 49 ppmw.

From the above results, the amount of the boron impurities adsorbed to the ion-exchange resin was 12.0 mg-boron/g-resin at the first time and 4.2 mg-boron/g-resin after nitrogen gas was passed. Thus, it was found that the amount of the boron impurities adsorbed to the ion-exchange resin was only 35% relative to the first time.

Example 2

Effect of Pretreating Ion-Exchange Resin with Hydrogen Chloride Gas

In order to verify the cleaning effect by hydrogen chloride gas on unused weakly basic ion-exchange resin, 4.88 g of dried AMBERLYST (registered trademark) B20-HG·DRY was put in a 500-cc sealed container; hydrogen chloride gas diluted with nitrogen to 1 vol % was first passed through the resin at 1 NL/min for 10 minutes and hydrogen chloride gas diluted with nitrogen to 30 vol % was then passed through the resin at 1 NL/min for 10 minutes to perform pretreatment; and dry nitrogen gas was finally passed through the resin at 1 NL/min for 10 minutes to replace the air in the system with nitrogen.

The resulting resin was mixed with 393 g of a tetrachlorosilane solution having a boron concentration of 175 ppw prepared by adding boron trichloride to tetrachlorosilane, and the mixture was stirred for 120 minutes. When the boron concentration in the resulting solution was analyzed, the concentration was found to be 1.8 ppmw.

Comparative Example 2

In the sealed container, was put as it is 4.99 g of dried AMBERLYST (registered trademark) B20-HG-DRY which was the same resin as used in Example 2. The resin was mixed with 393 g of a tetrachlorosilane solution having a boron concentration of 175 ppw which was used in Example 2, and the mixture was stirred for 120 minutes. When the boron concentration in the resulting solution was analyzed, the concentration was found to be 32 ppmw.

As a result of comparison between Example 2 and Comparative Example 2, the boron impurities adsorbed to the ion-exchange resin was found to be 11.3 mg-boron/g-resin in the case of the unused ion-exchange resin which was not treated with hydrogen chloride gas, while the boron impurities adsorbed to the ion-exchange resin was found to be 14 mg-boron/g-resin in the case of the ion-exchange resin which was treated with hydrogen chloride. Thus, the effect of pretreating the ion-exchange resin with hydrogen chloride gas was verified.

INDUSTRIAL APPLICABILITY

The present invention provides a technique which allows stable use of an ion-exchange resin for removing boron impurities over a long period of time in the purification step of a silane compound or a chlorosilane compound.

The invention claimed is:

1. A method for purifying a silane compound or a chlorosilane compound, wherein a weakly basic ion-exchange resin cleaned with a gas comprising hydrogen chloride is used to adsorb and remove a boron impurity contained in the silane compound or the chlorosilane compound, by contacting the silane compound or chlorosilane compound with the weakly basic ion-exchange resin.

2. The method for purifying a silane compound or a chlorosilane compound according to claim 1, wherein a water content in the gas comprising hydrogen chloride is 1 vol % or less.

3. The method for purifying a silane compound or a chlorosilane compound according to claim 1, wherein the gas comprising hydrogen chloride is a mixed gas comprising one or more gases selected from the group consisting of hydrogen, nitrogen, helium, and argon.

4. The method for purifying a silane compound or a chlorosilane compound according to claim 1, wherein the weakly basic ion-exchange resin is a weakly basic ion-exchange resin having a tertiary amine as an active group.

5. A method for regenerating a weakly basic ion-exchange resin which has been used to adsorb and remove a boron impurity from a silane or chlorosilane, comprising: cleaning the weakly basic ion-exchange resin with a gas comprising hydrogen chloride to regenerate the weakly basic ion-exchange resin.

6. The method for regenerating a weakly basic ion-exchange resin according to claim 5, wherein a water content in the gas comprising hydrogen chloride is 1 vol % or less.

7. The method for regenerating a weakly basic ion-exchange resin according to claim 5, wherein the gas comprising hydrogen chloride is a mixed gas comprising one or more gases selected from the group consisting of hydrogen, nitrogen, helium, and argon.

8. The method for regenerating a weakly basic ion-exchange resin according to claim 5, wherein the weakly basic ion-exchange resin is a weakly basic ion-exchange resin having a tertiary amine as an active group.

9. The method for purifying a silane compound or a chlorosilane compound according to claim 2, wherein the gas comprising hydrogen chloride is a mixed gas comprising one or more gases selected from the group consisting of hydrogen, nitrogen, helium, and argon.

10. The method for purifying a silane compound or a chlorosilane compound according to claim 2, wherein the weakly basic ion-exchange resin is a weakly basic ion-exchange resin having a tertiary amine as an active group.

11. The method for regenerating a weakly basic ion-exchange resin according to claim 6, wherein the gas comprising hydrogen chloride is a mixed gas comprising one or more gases selected from the group consisting of hydrogen, nitrogen, helium, and argon.

12. The method for regenerating a weakly basic ion-exchange resin according to claim 6, wherein the weakly basic ion-exchange resin is a weakly basic ion-exchange resin having a tertiary amine as an active group.

* * * * *